July 12, 1966        W. J. KLOVER        3,260,382
APPARATUS FOR REMOVING MATERIAL FROM A STORAGE STRUCTURE Filed June 22, 1964        2 Sheets-Sheet 1

INVENTOR.
WYBRANT J. KLOVER
BY
Andrus & Starke
ATTORNEYS

July 12, 1966  W. J. KLOVER  3,260,382
APPARATUS FOR REMOVING MATERIAL FROM A STORAGE STRUCTURE
Filed June 22, 1964  2 Sheets-Sheet 2
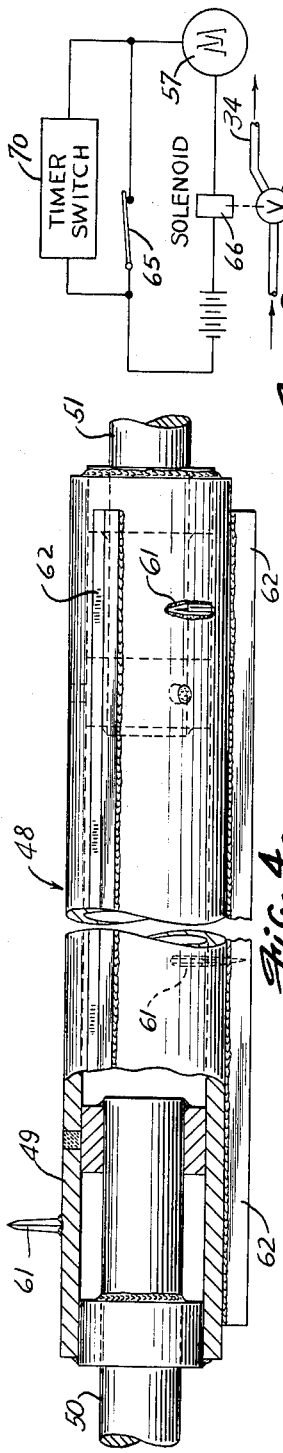
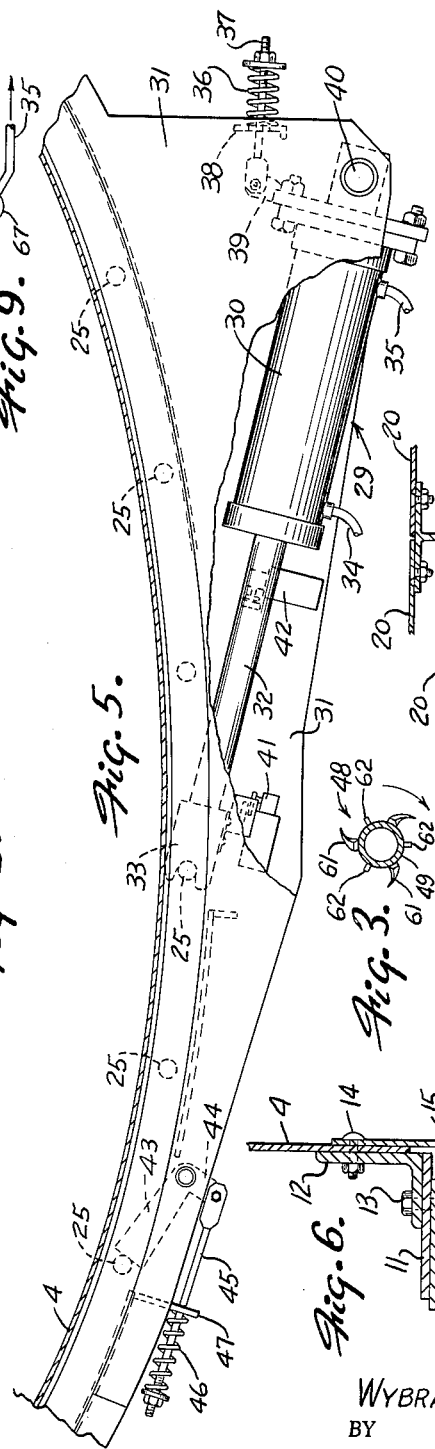
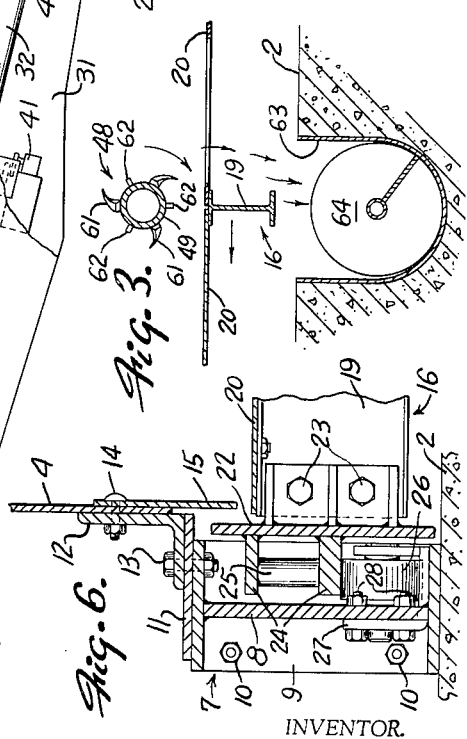
INVENTOR.
WYBRANT J. KLOVER
BY
Andrus & Starke
ATTORNEYS

United States Patent Office 3,260,382
Patented July 12, 1966

3,260,382
APPARATUS FOR REMOVING MATERIAL FROM A STORAGE STRUCTURE
Wybrant J. Klover, Elmhurst, Ill., assignor to A. O. Smith Harvestore Products, Inc., Arlington Heights, Ill., a corporation of Delaware
Filed June 22, 1964, Ser. No. 376,755
10 Claims. (Cl. 214—17)

This invention relates to an apparatus for removing a stored material from a storage structure.

Free-flowing materials, such as shelled corn, flour and the like are generally removed from a storage structure or bin by a conveying mechanism which is located in the base of the structure. The free-flowing material flows downwardly by gravity into a trough formed in the base or foundation and is conveyed to the exterior of the structure by the conveying mechanism.

In some cases, the stored material is not truly free-flowing in that the material, depending upon the size and nature of the particles, as well as its moisture content, will tend to bridge-over or arch, with the result that the material will not continuously flow downwardly to the conveying mechanism.

The patent to Wellford et al. 3,091,350 is directed to a device for eliminating arching of semi-free-flowing materials by agitating the stored material so that it will flow by gravity to the conveying mechanism. In the Wellford et al. patent, a turntable or floor having a series of openings is mounted for rotation in the lower portion of the storage bin above the foundation and the stored material is carried on the turntable. As the turntable is slowly rotated, the stored material is intended to be agitated or loosened which causes the material to flow downwardly through the openings in turntable to the foundation where it is conveyed to a conveyor trough.

Unloading mechanisms of this type have a low delivery rate due to the fact that the stored material tends to rotate with the turntable rather than the turntable rotating beneath the mass of material. Thus, the desired degree of agitation is not achieved and only small amounts of silage are delivered through the openings in the turntable to the foundation floor.

The present invention is directed to an unloading apparatus using the turntable principle which greatly increases the delivery capacity of the unloading mechanism and reduces the driving force required for rotating the turntable. More specifically, the apparatus of the invention includes a truntable which supports the stored material and is mounted for rotation on a central post. The turntable is provided with a series of openings or apertures through which the stored material is discharged to the foundation floor, and beams depending from the turntable serve to convey the stored material across the foundation floor to a trough where a conveying mechanism delivers the material to the exterior of the storage structure. According to the invention, a bar extends radially from the central post to the wall of the structure slightly above the upper surface of the turntable. In the preferred embodiment, the bar is a rotating member adapted to rotate about its axis and carries a series of agitating members which slice through and dislodge the stored material.

As the turntable slowly rotates within the structure, the bar agitates and dislodges the stored material so that it falls downwardly through the openings in the turntable and is delivered to the trough formed in the foundation floor.

The use of the radially extending bar, in conjunction with the rotating turntable, prevents the mass of material from rotating with the turntable and, in effect, provides a positive agitation which dislodges the silage and causes it to flow by gravity downwardly through the openings in the turntable. This structure substantially increases the delivery rate over that of prior art devices which merely employ a rotating turntable.

The use of the power driven agitator bar also results in a substantially lesser driving force being required to rotate the turntable as compared to prior art devices.

Other objects and advantages will appear in the course of the following description.

The drawings illustrate the best mode presently contemplated of carrying out the invention.

In the drawings:

FIG. 3 is a section taken along line 3—3 of FIG. 2 and showing the relationship of the agitator roller and the conveyor trough;

FIG. 4 is a side elevation, with parts broken away, of the agitator roller;

FIG. 5 is an enlarger fragmentary horizontal section, with parts broken away, showing a hydraulic drive unit;

FIG. 6 is an enlarged section taken along line 6—6 of FIG. 2;

FIG. 7 is an enlarged taken along line 7—7 of FIG. 2; and

FIG. 8 is a fragmentary vertical section taken through the feed conveying unit and showing the drive control switch.

Figure 1:
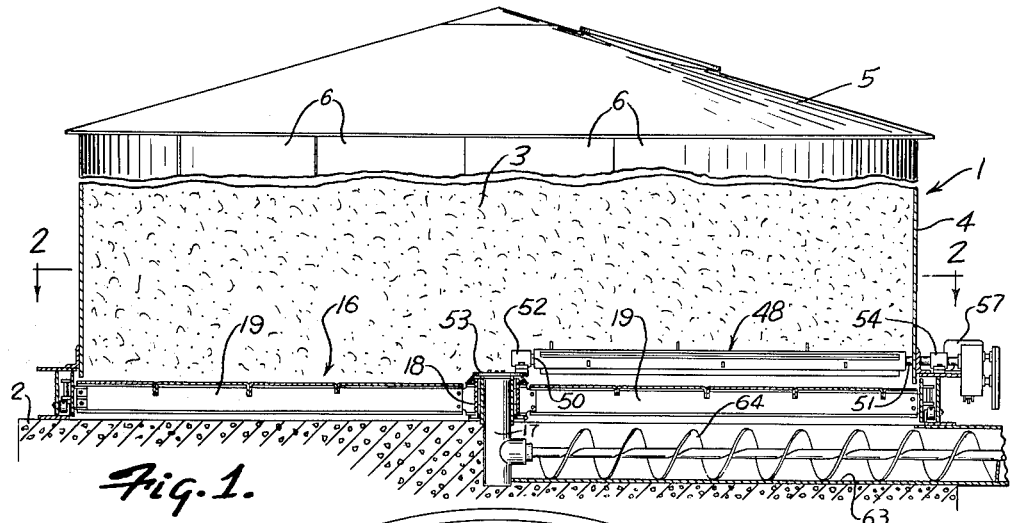
FIG. 1 is a vertical section, with parts broken away, of a storage structure incorporating the unloading mechanism of the invention.

The drawings illustrate a storage structure 1 which is supported on a foundation 2 and is adapted to store a semi-free flowing material 3, such as woodchips, shelled corn, sawdust, or the like.

The storage structure 1 comprises a generally cylindrical shell 4 which is enclosed by a roof 5. The shell 4 can be formed of a series of generally curved plates 6 which are connected together by welding, bolts, or the like, to provide the cylindrical shell. The plates 6 can be coated with a corrosion resistant material, such as glass, if desired.

The shell 4 is mounted on an annular base 7 which is composed of a series of generally curved I-beams 8. Vertical plates 9 are secured edgewise to the web of the beams 8 at the ends of the beams and the plates 9 are connected together by bolts 10 to provide the annular base 7.

As best shown in FIG. 6, an annular cover plate 11 is disposed on the upper flange of the base 7, and a base angle 12 is supported on the plate 11 and connected to the upper flange of the base 7 by bolts 13.

The plates 6 at the lower end of the shell 4 are connected to the upstanding flange of the base angle 12 by bolts 14 so that the entire shell 4 is supported from the annular base 7. In addition, an annular shield 15 is secured to the base angle 12 and extends downwardly below the upper flange of the base 7.

According to the invention, the stored material 3 is supported on a turntable 16 which is mounted for rotation on a central vertical post 17. As best shown in FIG. 1, the turntable 16 includes a central hub 18 which is journalled on post 17, and a series of radial beams 19 are connected to the hub and extend outwardly to a location beneath the shield 15. A series of floor plates 20 are secured to the upper flanges of the radial beams 19 to provide a supporting floor for the turntable 16. The floor plates 20 are provided with a series of openings 21 and the openings are distributed throughout the entire area of the turntable 16. Openings 21 serve as discharge ports and the stored material 3 falls through the openings to the foundation 2.

To support the turntable 16 for rotation, a bracket 22 is secured to the outer end of each radial beam 19 by bolts 23 and the bracket includes a pair of vertically spaced flanges 24. A drive lug 25 is secured between the flanges 24. The lower of the pair of flanges 24 is adapted to ride on a series of rollers 26 which are journalled within U-brackets 27 supported on the lower flange of the base beam 8. One flange of the U-bracket 27 extends through an opening in the web of the base beam 8 and the flange of the U-bracket is secured to the web by bolts 28.

Figure 2:
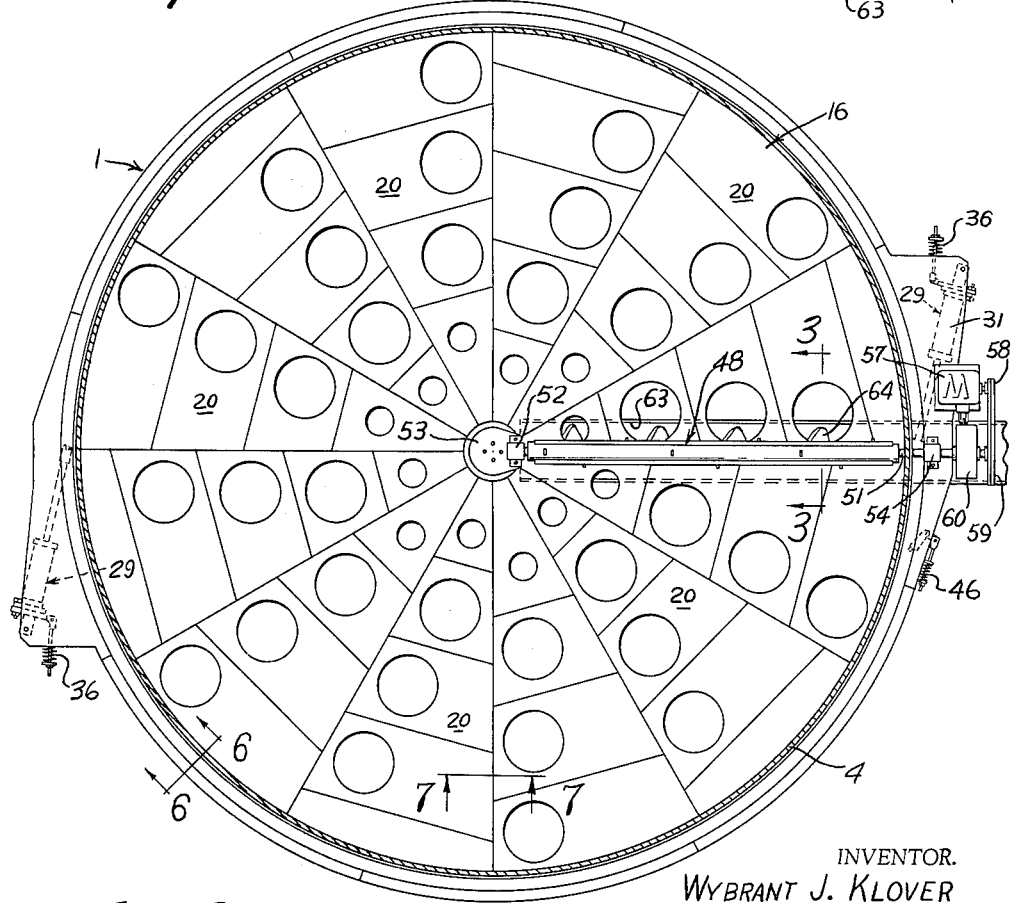
FIG. 2 is a horizontal section taken along line 2—2 of FIG. 1.

The turntable 16 is rotated within the storage structure 1 by a hydraulic drive system, best shown in FIGS. 2 and 5. The drive system includes a pair of hydraulic cylinder units 29, each of which includes a cylinder 30 carried by plates 31 attached to the flanges of the base beam 7. A piston is slidably mounted within the cylinder 30 and the piston rod 32 has a split or bifurcated head 33 which is adapted to successively engage each of the drive lugs 25 to rotate the turntable in a series of steps or increments. Hydraulic fluid is introduced into opposite ends of the cylinder 30 through lines 34 and 35 and the flow of the hydraulic fluid is controlled by a conventional solenoid valve assembly.

Each cylinder 30 is biased inwardly toward the storage structure 1 by a spring 36 which is disposed around a rod 37 carried by a spring bracket 38. The end of the rod 37 is connected by link 39 to a flange on the end of the cylinder 30 and the force of the spring 36 acts in a direction to pivot the cylinder around its pivotal connection 40 with plates 31 to bias the cylinder and piston rod 32 inwardly toward the storage structure 1. With this construction, the piston rod 32 extends through a slot in the web of base beam 7 and as hydraulic fluid is introduced into the cylinder through line 35, piston rod 32 will move outwardly into engagement with the lug 25 and thereby move the lug to the left, as shown in FIG. 5, causing the turntable 16 to rotate through an increment equal to the stroke of the piston rod. At the completion of the outward stroke, the valve assembly reverses the flow of fluid through hydraulic line 34 to thereby retract the piston rod 32 to its original position, and the spring 36 urges the head 33 into engagement with the ring 22. As the piston rod is retracted, head 33 will ride rearwardly over the next succeeding lug 25. At the end of the return stroke, piston rod head 33 will be in position to pick up or engage the next lug on the succeeding forward stroke.

The hydraulic units 29 are actuated by standard limit switch mechanisms 41 and 42. At the end of the outward stroke, head 33 engages limit switch 41 which operates to energize the solenoid valve assembly to reverse the flow of fluid to cylinder 30. At the end of the inward stroke, head 33 engages limit switch 42 to again actuate the valve assembly and reverse the fluid flow.

To prevent the turntable from moving in the opposite direction, a holding pawl 43 is pivotally connected to the plates 31 and is adapted to engage the drive lugs 25. The pawl 43 is secured to a link 44 which is connected to a spring rod 45. A coil spring 46 is disposed around the rod 45 and bears between a spring bracket 47 secured to beam 7 and a disc located on the end of rod 45. The spring 46 urges the pawl 43 inwardly toward the storage structure. The drive lugs 25 move with the turntable 16 and each successive drive lug will be engaged by the pawl 43 as the turntable is rotated to prevent rearward movement of the turntable.

The stored material 3 is supported on the turntable 16, and the turntable is rotated beneath the stored material, which causes the material to drop downwardly through the openings 22 into the area beneath the turntable. However, in practice, it has been found that the stored material 3 may tend to rotate with the turntable with the result that the material will not fall downwardly through the openings 22. According to the invention, a roller agitator 48 is mounted in fixed relation above the turntable, and as the turntable 16 rotates with relation to the roller agitator 48, the material 3 engages the agitator 48 and is dislodged so that it will fall through the openings 22.

The roller agitator 48 includes a hollow cylinder or sleeve 49 and shafts 50 and 51 are secured within the ends of the cylinder 49. The inner shaft 50 is journalled within a bearing 52 mounted on post cover plate 53. The outer shaft 51 extends outwardly through the shell 4 and is journalled within a bearing 54 mounted on plate 31. The roller agitator 48 is rotated about its axis by a motor 57 which is mounted on plate 31. The motor shaft 58 is connected through belt drive 59 and transmission 60 to the roller shaft 51. Thus, operation of the motor 57 will serve to rotate the roller agitator 48 about its axis.

As best shown in FIG. 4, the roller agitator 48 includes a series of hook-like teeth 61 which are welded at spaced intervals to the periphery of the cylinder 49. The teeth 61 are provided with sharpened points which extend in the direction of rotation of the agitator 48. As shown in FIG. 3, the teeth are located approximately 120° apart and serve to engage and slice through the stored material, thereby insuring that the material will fall downwardly by gravity through the openings 22 in the turntable 16.

In addition to the teeth 61, the roller agitator also includes a series of scraper bars 62 which extend longitudinally of the roller agitator and are located 120° apart. As shown in FIG. 3, the bars 62 are positioned 60° from the teeth 61. The scraper bars 62 work in conjunction with the teeth 61 and prevent the material from packing against the body of the cylinder 49. The horizontal bars 62 agitate the material causing the material to roll over the bar and, in effect, serve as a series of teeth.

During operation, the roller agitator 48 is rotated about its axis by motor 57. As the turntable 16 is rotated in increments by the hydraulic drive, the stored material 3 supported on the turntable will be engaged by the teeth 61 and the scraper bars 62 which serve to dislodge the material and loosen it so that it can fall downwardly through the openings 22 onto the foundation 2. The material is conveyed along the top of the foundation 2 by the rotating beams 19 of the turntable and discharged into a radially extending trough 63 formed in the foundation 2.

A suitable conveyor 64 is mounted within the trough 63 to convey the material to the exterior of the foundation 2. As shown in the drawings, the conveyor is in the form of an auger. However, it is contemplated that any type of conveying mechanism, such as a bucket conveyor, or a chain conveyor, can be used for this function.

Generally, the roller agitator 48 and the turntable 16 are operated together so that the turntable will slowly revolve as the roller 48 is rotated to dislodge the stored material. However, it is not necessary to rotate the turntable 16 in order to discharge material through the openings 22. The roller agitator 48 will agitate and dislodge the stored material so that it will fall into the openings 22, and as the roller agitator is located in substantial alignment with the trough 63, the material will fall directly into the trough where it can be removed by the auger 64. However, to prevent the material from being removed from only one sector of the storage structure, the turntable 16 is usually rotated simultaneously with the roller 48, or at least intermittently during the period of operation of the roller 48. This will insure that the stored material is removed from all sectors of the structure and prevent collapse of the walls of the structure which could occur by virtue of unequalized unloading.

Rotation of the turntable 16 and roller agitator 48 can be controlled by a limit switch 65 located in the discharge trough 63. As shown in FIG. 9, the limit switch 65 is connected in series with the motor 57 for roller 48 and a solenoid 66 for a valve assembly 67 which operates the hydraulic drive units 29. The limit switch 65 is normally closed, and a board 68 is pivotally connected to the sides of the trough 63 and is adapted to be pivoted upwardly by the material as it is conveyed in the trough, to thereby open the limit switch and stop the operation of the roller 48 and turntable 16. The conveyor 64 operates continuously and independently from the roller 48 and turntable 16. As the material flows by gravity to fill the trough 62, and is conveyed to the exterior by auger 64, the board 68 will be pivoted up to open the limit switch 65. When the gravity flow decreases or stops, the board 68 will pivot downwardly out of engagement with limit switch 65 to thereby close the switch and start operation of the roller 48 and turntable 16 so that additional material will be delivered to the trough 63. When the trough 63 is again filled, the material being conveyed within the trough will pivot the board 68 upwardly to open the limit switch and again stop the operation of the roller 48 and turntable 16. Suitable stops 69 are positioned in the conveyor trough 63 to limit the downward pivotal movement of the board 68 and insures that the board will not contact the rotating auger.

In addition, it is contemplated that a conventional timing switch 70 may be connected across the limit switch 65, as shown in FIG. 9, to insure that the turntable will be rotated periodically. For example, the timing switch 70 may be set to close the circuit and operate the roller 48 and turntable 16 10 minutes of every hour in above freezing temperature and 20 minutes of every hour in freezing temperature so that the stored material does not pack too hard or freeze to the shell 4 of the storage structure.

The roller agitator 48 provides a positive agitation which continuously dislodges the stored material so that it will flow by gravity through the openings in the turntable. This greatly increases the capacity or output of the unloading mechanism and substantially reduces the driving force required to rotate the turntable.

Various modes of carrying out the invention are contemplated as being within the scope of the following claims particularly pointing out and distinctly claiming the subject matter which is regarded as the invention.

I claim:

1. An unloading mechanism for removing a stored material from a storage structure mounted on a base, comprising a turntable mounted for rotation above the base and having a plurality of openings therein, means for rotating the turntable within the storage structure, conveying means located beneath the turntable for conveying stored material passing through the openings to the exterior of the structure, elongated means disposed above the turntable and extending from adjacent the axis of the turntable to the periphery thereof and the axis of said elongated means being substantially horizontal, said means being fixed with respect to the turntable and disposed to dislodge the material when the turntable is rotated to thereby aid in discharging the material through the openings in the turntable to the conveying means.

2. In an apparatus for storing and unloading material, a storage structure, a stationary base supporting the storage structure, a post disposed centrally of the base, a turntable disposed within the storage structure and mounted for rotation about the axis of the post above the base, said turntable being provided with a plurality of openings, conveying means located beneath the turntable for conveying material passing through the openings to the exterior of the structure, a material-dislodging member disposed above the turntable, means for securing one end of the member to said post, means for securing the opposite end of said member to the wall of the structure, said member serving to dislodge the stored material when the turntable is rotated with respect to the member to thereby aid the gravity feed of said material downwardly through the openings in the turntable.

3. In an apparatus for storing and discharging material, a stationary base, a storage structure mounted on the base, a turntable disposed within the structure above the base and mounted for rotation with respect to the base and having a series of openings therein, conveying means beneath the turntable for conveying material passing through the openings to the exterior of the structure, a material-dislodging member disposed above the turntable and extending radially from adjacent the center of the structure to the wall thereof, said member being fixed with respect to the storage structure and base, and means for rotating the member about its axis with said member serving to agitate and dislodge the material as the turntable is rotated to thereby aid in the gravity feed of the material downwardly through the openings in the turntable.

4. In an apparatus for storing and unloading material, a base having a radially extending trough therein, a storage structure supported on the base, a floor mounted for rotation in the storage structure above the base and having a plurality of discharge openings therein, means for rotating the floor, conveying means located within the trough to the exterior of the structure, and material-dislodging means disposed above the floor and extending generally from the center of the storage structure to said wall, said means being fixed with respect to the floor and being located in substantial vertical alignment with said trough, said dislodging means serving to dislodge the material when the floor is rotated to thereby aid in the gravity feed of the material downwardly through the openings in the floor to the conveyor means.

5. The structure of claim 4, and including second drive means for rotating the dislodging means about its axis, said second drive means being separate from said first drive means.

6. The structure of claim 3, and including material-cutting means disposed on said dislodging member and adapted to cut and dislodge the material as the agitator member is rotated about its axis.

7. The structure of claim 6 in which said material-cutting means comprises a plurality of teeth with said teeth having generally pointed tips facing circumferentially in the direction of rotation of said dislodging member.

8. In a storage structure containing a stored material and having a turntable adapted to support the material and mounted for rotation about a central axis, the improvement comprising material-dislodging means fixed with respect to the turntable and extending in a plane above the turntable from adjacent the center of the structure toward the wall thereof, means for rotating said dislodging means about the axis thereof, a series of teeth mounted in spaced relation on the outer surface of said dislodging means and adapted to cut and dislodge the material as said dislodging means is rotated, and a series of generally longitudinally extending scraping members secured to the outer surface of the dislodging means and spaced in relation to said teeth, said scraping members preventing an accumulation of said stored material on the surface of the dislodging means.

9. In an apparatus for storing and unloading material, a storage structure, a stationary base supporting the storage structure and including a trough extending radially from the center of the structure to the exterior thereof, a turntable mounted for rotation above the base and provided with a series of material discharge openings, drive means for rotating said turntable, conveying means located within the trough for conveying material within the trough to the exterior of the structure, material-dislodging means disposed above the turntable and extending generally from the center of the structure to the wall, said dislodging means being fixed with respect to the turntable, second drive means for rotating said dislodging means to agitate and dislodge material when the turntable is rotated, and means responsive to a given flow of material in the trough and operably connected to said first and second drive means for operating said first drive means and said second drive means when the flow falls below a predetermined rate and for stopping said first drive means and said second drive means when the flow of material in the trough exceeds said predetermined rate.

10. In an apparatus for storing and unloading material, a storage structure, a stationary base supporting the storage structure and including a trough extending radially from the center of the structure to the exterior thereof, a turntable mounted for rotation above the base and provided with a series of material discharge openings, drive means for rotating said turntable, conveying means located within the trough for conveying material within the trough to the exterior of the structure, material-dislodging means disposed above the turntable and extending generally from the center of the structure to the wall, said dislodging means being fixed with respect to the turntable, second drive means for rotating said dislodging means to agitate and dislodge material when the turntable is rotated, switch means connected in an electrical circuit with said first drive means and said second drive means, and means for actuating said switch means when the flow of material within the trough exceeds a predetermined rate to thereby stop the rotation of the turntable and rotation of said agitator member and for starting rotation of the turntable and rotation of the agitator member when the flow of material within said trough falls below said predetermined rate.

References Cited by the Examiner

UNITED STATES PATENTS

| | | | |
|---|---|---|---|
| 2,767,884 | 10/1956 | Gross | 222—410 X |
| 2,864,655 | 12/1958 | Caron. | |
| 2,981,402 | 4/1961 | Cleaveland | 214—17 XR |
| 3,091,350 | 5/1963 | Wellford et al. | 214—17 |

FOREIGN PATENTS 728,760   4/1955   Great Britain.

GERALD M. FORLENZA, *Primary Examiner.*

HUGO O. SCHULZ, *Examiner.*

R. SHERIDAN, *Assistant Examiner.*